United States Patent
Zaki et al.

(10) Patent No.: US 10,286,791 B2
(45) Date of Patent: May 14, 2019

(54) MOTOR VEHICLE CHARGING SOCKET HAVING OVERHEATING PROTECTION

(71) Applicants: AUDI AG, Ingolstadt (DE); Dr. Ing. h.c. F. Porsche AG, Stuttgart (DE)

(72) Inventors: Sami Robert Zaki, Regensburg (DE); Florian Auberger, Kösching (DE); Daniel Spesser, Illingen/Schützingen (DE)

(73) Assignees: AUDI AG, Ingolstadt (DE); Dr. Ing. h.c. F. Porsche AG, Stuttgart (DE)

( * ) Notice: Subject to any disclaimer, the term of this patent is extended or adjusted under 35 U.S.C. 154(b) by 110 days.

(21) Appl. No.: 15/526,505

(22) PCT Filed: Nov. 12, 2015

(86) PCT No.: PCT/EP2015/076490
§ 371 (c)(1),
(2) Date: May 12, 2017

(87) PCT Pub. No.: WO2016/075267
PCT Pub. Date: May 19, 2016

(65) Prior Publication Data
US 2017/0320397 A1 Nov. 9, 2017

(30) Foreign Application Priority Data
Nov. 13, 2014 (DE) .................. 10 2014 016 825

(51) Int. Cl.
*B60L 11/18* (2006.01)
*B60L 3/04* (2006.01)
(Continued)

(52) U.S. Cl.
CPC ............ *B60L 11/1816* (2013.01); *B60L 3/04* (2013.01); *B60L 53/14* (2019.02); *B60L 53/30* (2019.02);
(Continued)

(58) Field of Classification Search
USPC ........................................................ 320/134
See application file for complete search history.

(56) References Cited

U.S. PATENT DOCUMENTS

| 2009/0316321 A1 | 12/2009 | Ouwerkerk |
| 2012/0249066 A1 | 10/2012 | Ichikawa |
| 2016/0059719 A1* | 3/2016 | Jung .................. B60L 11/1818 320/109 |

FOREIGN PATENT DOCUMENTS

| CN | 1341860 A | 3/2002 |
| CN | 103402812 A | 11/2013 |

(Continued)

OTHER PUBLICATIONS

International Search Report dated Feb. 17, 2016 in corresponding PCT/EP2015/076490; 17 pages.
(Continued)

*Primary Examiner* — Bryce M Aisaka
(74) *Attorney, Agent, or Firm* — Maier & Maier, PLLC

(57) ABSTRACT

A method for recognizing an over-temperature in a region of a charging socket of a motor vehicle without a temperature sensor. A temperature value is detected by means of a temperature sensor at an installation location of the temperature sensor that is different from the region. At least one configuration value of a current operating configuration in which the charging socket is operated is determined, and then a temperature reading for the region without the temperature sensor is generated by means of a characteristic map, which is designed for the purpose of including the temperature value and the at least one configuration value as input variables and of assigning the temperature reading to these input variables.

7 Claims, 1 Drawing Sheet

(51) Int. Cl.
  *B60L 53/14* (2019.01)
  *B60L 53/30* (2019.01)
(52) U.S. Cl.
  CPC ...... *B60L 2240/549* (2013.01); *Y02T 10/7005* (2013.01); *Y02T 10/7088* (2013.01); *Y02T 90/14* (2013.01)

(56) References Cited

FOREIGN PATENT DOCUMENTS

| | | |
|---|---|---|
| DE | 102009034886 A1 | 2/2011 |
| DE | 102010045131 A1 | 3/2012 |
| DE | 102012200523 A1 | 8/2012 |
| DE | 102011106335 A1 | 1/2013 |
| DE | 102012107902 A1 | 3/2014 |
| DE | 102012019605 A1 | 4/2014 |
| EP | 2679438 A2 | 1/2014 |
| GB | 2489988 A | 10/2012 |
| JP | 2012-100383 A | 5/2012 |
| JP | 2015-233366 A | 12/2015 |
| KR | 2001-0059086 A | 7/2001 |
| WO | 2012/129104 A1 | 9/2012 |
| WO | 2012/139778 A2 | 10/2012 |
| WO | 2013/132874 A1 | 9/2013 |
| WO | 2013/152376 A2 | 10/2013 |

OTHER PUBLICATIONS

German Examination Report dated Jun. 12, 2015 in corresponding DE10 2014 016 825.5; 7 pages.
Phoenix Contact: Lösungen für die Elektromobilität. Blomberg, 2013. —Firmenschrift, 16 pgs.
Japanese Office Action dated May 22, 2018, in connection with corresponding JP Application No. 2017-526080 (2 pgs.).
Translation of the International Preliminary Report on Patentability dated May 26, 2017, in connection with corresponding international Application No. PCT/EP2015/076490 (13 pgs.).
Chinese Office Action dated Nov. 23, 2018, in connection with corresponding CN Application No. 201580061602.0 (12 pgs., including machine-generated English translation).

\* cited by examiner

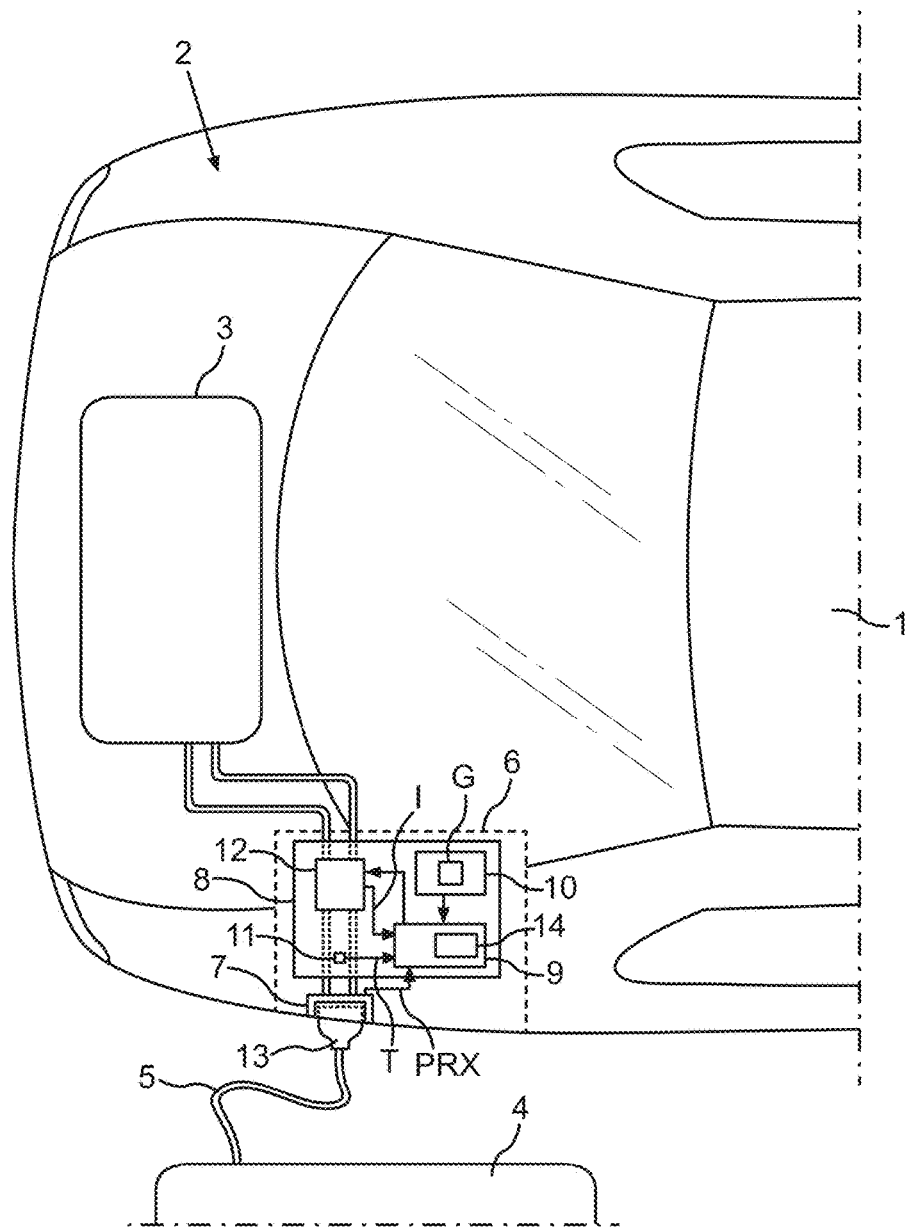

MOTOR VEHICLE CHARGING SOCKET HAVING OVERHEATING PROTECTION

FIELD

The invention relates to a method for recognizing an over-temperature in a region of a charging socket of a motor vehicle without a temperature sensor. Upon recognition of an over-temperature, a protective measure for the charging socket is triggered. Also belonging to the invention are a charging device for a motor vehicle, by means of which the method according to the invention can be implemented, as well as a motor vehicle with the charging device.

BACKGROUND

An electric energy storage device, for example a battery, in particular a high-voltage battery, can be provided in a motor vehicle for operating an electric drive motor. High voltage here is to be understood as an electrical voltage of more than 60 volts, in particular more than 100 volts. For charging the energy storage device, a charging cable of a charging station external to the vehicle can be connected to a charging receptacle or charging socket of the motor vehicle. During charging of the energy storage device, a heating of a component of the charging socket can occur. Protection against an overheating must be provided here.

The temperature in the charging socket is measured currently via a temperature sensor. The charger is the component that connects the charging socket to the energy storage device and that controls the charging current. When a temperature that lies above a threshold value is indicated by the temperature sensor, the charging process is interrupted in order to protect the charging socket and the charging plug of the charging cable. Since the temperature sensor is found, in fact, in the charging socket, but does not have direct contact with the phase contacts, the temperature value signaled by the temperature sensor does not involve the actual temperature at the hottest point (English: hot spot) of the charging socket, but rather is an orienting value, which must be effectively interpreted as correct so that one reliably recognizes an over-temperature in the charging socket itself.

This interpretation is effectively difficult, since charging sockets of many different variants are used. There are different power classes, which are distinguished with respect to the electrically conductive cross section of the components of the charging socket. There are also different versions for different countries and these define a geometric configuration of the charging socket. Also, a plurality of different plugs of charging cables can be connected to a specific charging socket, so there are also many plug combinations. Different positions for the temperature sensor in the structure of the charging socket are also possible.

These differences mean that there is a broad temperature range for a necessary disconnection in order to protect the charging socket. In other words, the threshold value with which the temperature value signaled by the temperature sensor is compared must be adjusted relatively low in order to reliably prevent overheating for all conceivable operating configurations in which the charging socket can be operated. The functional range is limited thereby, however, since there are a number of combinations in which the threshold value is too low. In other words, potential that involves the transmission of electrical power for a rapid charging of the energy storage device is wasted here.

A method for operating a charging port apparatus for electric vehicles is known from WO 2013/152376 A2. Exceeding the admissible current carrying capacity of a charging cable is avoided with the method. For this, the root mean square value of the current that thermally loads the charging cable is determined on the basis of a current measurement.

A modular system for a charging device in which a temperature sensor is also integrated is known from DE 10 2012 019 605 A1. By monitoring the temperature, it is assumed that a temperature which increases to above a specific value can supply an indication of an error function, whereas it is assumed that a temperature within the region defined by limit values signals that a charging process is correctly proceeding.

A plug connector for an electric vehicle in which a current measuring device and a voltage measuring device are integrated for measuring a charging voltage is described in DE 10 2010 045 131 A1.

SUMMARY OF THE DISCLOSURE

The object of the invention is to utilize the thermal operating limitations that result from the current operating configuration of the charging socket for a motor vehicle.

The object is achieved by the subjects of the independent patent claims. Advantageous enhancements of the invention result from the features of the dependent patent claims.

According to the invention, a method is provided for recognizing an over-temperature in a region of a charging socket of a motor vehicle without a temperature sensor. A temperature value is, in fact, detected by means of a temperature sensor; however, the temperature sensor here is not found directly in the region being monitored, but rather at an installation location for the temperature sensor that is different from this region, e.g., in a charger that receives a charging current via the charging socket. The combination of charging socket and charger is designated as the charging device in the following.

The question now is how can one meaningfully interpret this temperature value in order to recognize whether the charging socket is found at its operating limits relative to temperature, i.e., whether an over-temperature is present in the region without a temperature sensor. Over-temperature means here, first of all, that there is a risk of overheating, i.e., of a thermal disruption of a component of the charging socket. Additionally or alternatively, over-temperature means that the charging socket is disproportionally intensely heated relative to the transmitted charging power, i.e., a defect is present.

At least one configuration value of a current operating configuration in which the charging socket is operated is determined, in order to interpret the temperature value. Which current operating configuration this may be, will be discussed more precisely below. Based on the at least one configuration value and the temperature value, a temperature reading is determined for the region without a temperature sensor. This is carried out by means of a characteristic map, which is designed for the purpose of including the temperature value and the at least one configuration value as input variables, and to assign the temperature reading to these input variables The temperature reading is to be understood here as an indication of a concrete temperature value, or, instead, a binary option is indicated, such as "charging socket is overheating"/"charging socket is within admissible temperature region", for example. The described characteristic map is a mapping function, by means of which an output value, namely the temperature reading, is assigned to the input variables. Depending on the temperature reading, a protective measure for the charging socket is triggered, namely when the temperature reading signals that an over-temperature is present in the charging socket.

The invention has the advantage that the charging socket can be utilized up to those operating limitations that are provided in the respective motor vehicle in the current operating configuration specific for the vehicle. In other words, the temperature value of the temperature sensor can be interpreted more precisely, since a more accurate alignment of the measured temperature value to the actual operating temperature prevailing in the region without a temperature sensor is possible.

To produce a suitable characteristic map, charging processes with different operating configurations, for example, can be carried out and then the resulting operating temperature in the region of the charging socket can be determined, e.g., by means of a thermometer, for each charging process with the respective combination of temperature value and at least one configuration value. This measured operating temperature can be correspondingly stored as the temperature reading in the characteristic map, so that the thermometer is no longer necessary. The temperature reading can also simply imply only whether or not an over-temperature results.

In one embodiment, at least one configuration value for a geometric configuration is determined. A geometric property of the charging device is described by the geometric configuration. In particular, a county-specific structural form of the charging socket and/or of the installation location of the temperature sensor is described by the geometric configuration. This provides the advantage that a geometric distance and/or a thermal resistance between the temperature sensor on one side and the region that is heated most intensely during operation, the so-called hot spot (hot point) is considered. A hot spot can be, for example, the contact region between electrical contacts of the charging socket on one side, and corresponding electrical contacts of a plugged-in charging plug of a charging cable on the other side.

In one embodiment, at least one configuration value for a switch configuration is determined. The switch configuration describes the electrical property of the utilized current path, which conducts the charging current from the charging station to the energy storage device. In particular, a switch reading is determined, which distinguishes between a single-phase and a multi-phase (for example, dual-phase) charging operation. Additionally or alternatively, for this purpose, a cross section of a charging cable electrically connected to the charging socket is determined by a configuration value. In particular, the cable cross section can be determined indirectly, for example, by determining the plug type, e.g., according to the International Standard IEC 62196. The cable cross section has a significant effect on the heat dissipation capacity of the charging cable, i.e., its cooling effect.

It is particularly preferred that the switch configuration is determined by readout of a resistance coding of the charging cable. This can be automated by the charger of the charging device of the motor vehicle. For example, the PRX resistance in the plug can be evaluated.

In one embodiment, at least one configuration value for an electrical configuration is determined. The electrical configuration here indicates the operating state of the charging device during the charging process. In particular, the electrical configuration given by a configuration value in each case indicates the following: A power class of the charging socket; a current intensity of a charging current that is conducted via the charging socket; an electrical voltage of a connected charging station; an alternating frequency or frequency of the electrical voltage; an operating time from which charging has occurred; a charging state of an energy storage device that is charged via the charging socket. Consideration of the power class provides the advantage that the structurally conditioned or structurally provided heat capacity and/or heat conductivity of the charging socket and/or of the connected charging cable is (are) taken into account. Consideration of the current intensity and/or the voltage and/or the frequency of the voltage provides the advantage that the power loss consumed in the charging socket can be determined. Consideration of the operating time provides the advantage that it can be taken into account how long the power loss has occurred in the charging socket. Consideration of the charging state of the energy storage device provides the advantage that it can be taken into account how long the charging process will probably still last.

In one embodiment, an electrical charging process of the motor vehicle is interrupted as the protective measure. The advantage here is that there is no further power loss consumed in the charging socket and thus the heating process is interrupted. One embodiment provides that a charging current intensity is reduced or throttled, so that, in addition, a charging current is still present. The advantage here is that the charging process can be continued. One of the two protective measures is initiated when the temperature reading signals an over-temperature in the charging socket.

It is particularly preferred that a defect in the charging socket based on a combination of temperature value and at least one configuration value is recognized by means of the characteristic map. In other words, the characteristic map can also be used to advantage for the purpose of recognizing an atypical combination of temperature value and at least one configuration value for a charging process implemented as intended, and then to initiate the protective measure. For example, it may happen that a relatively high temperature value is present, although only a small charging power is transmitted via the charging socket. This can be the case only if an undesirably large power loss is consumed in the charging socket, for example, because contacts are corroded. In such a case then, the initiation of the protective measure is also meaningful, although the operating temperature in the charging socket need not necessarily lead to a thermal disruption of the charging socket. For producing a characteristic map, a charging socket may be intentionally damaged, so that a defect is present. Then a defect-specific combination for the temperature value of the temperature sensor and the at least one configuration value results. The temperature reading in the characteristic map can then imply that this combination indicates a defect in the charging socket, so that when the characteristic map is used in a motor vehicle, this defect alone can be recognized by means of the characteristic map, based on the temperature value and the at least one configuration value.

The invention also relates to a charging device for a motor vehicle. A charging device is understood to be the described combination of charging socket and downstream-connected charger. In other words, the charging device has a temperature sensor for producing a temperature value. In addition, a means for querying the configuration is provided, which is designed for the purpose of determining at least one configuration value of a current operating configuration of the charging socket. The configuration query means can be, for example, a test circuit for querying a resistance coding. The configuration query means can also comprise a program module for a processor means of the charging device. The configuration query means can also comprise a data memory, in which a configuration value is stored, and this value can be stored, for example, in the data memory during the manufacture of the motor vehicle. In addition, a characteristic map is provided, which is designed for the purpose of receiving the temperature value and the at least one configuration value as input variables, and of assigning the temperature reading as the output value for the input variables, this output value indicating whether an undesired high temperature, thus an over-temperature, is present for the combination of temperature value and at least one configuration value. The characteristic map can be represented, e.g., by stored values and/or by a parameterized equation. In addition, a processor means of the charging device is designed for the purpose of implementing one embodiment of the method according to the invention. The processor means can be, for example, a microcontroller of the charging device. The described configuration query means can also be realized by the processor means.

Finally, the invention also relates to a motor vehicle having an electric energy storage device, for example a battery, and an embodiment of the charging device according to the invention The motor vehicle according to the invention is preferably configured as an automobile, in particular as a passenger car.

BRIEF DESCRIPTION OF THE DRAWING

An example of embodiment of the invention is described in the following. For this, the single FIGURE shows an embodiment of the motor vehicle according to the invention.

DETAILED DESCRIPTION OF THE DRAWING

The exemplary embodiment explained in the following involves a preferred embodiment of the invention. In the case of the exemplary embodiment, however, the described components of the embodiment in each case represent individual features of the invention that are to be considered independent from one another, each of the features also enhancing the invention independent from one another and thus are also to be viewed as a component of the invention, individually or in a combination that is different from that shown. In addition, the described embodiment can also be supplemented by other features of the invention that have already been described.

FIG. 1 shows a motor vehicle 1, which may involve, for example, an automobile, in particular, a passenger vehicle. The rear 2 of the motor vehicle is shown. The motor vehicle 1 can be, for example, an electrically driven motor vehicle or a hybrid vehicle. For operating an electric drive motor (not shown), the motor vehicle can have an energy storage device 3, for example, a vehicle battery, in particular a high-voltage battery. The energy storage device 3 can be charged with electric power via a charging station 4 that is external to the vehicle. For this, the charging station 4 can be electrically connected to the motor vehicle 1 via a charging cable 5. The motor vehicle 1 can have a charging device 6 for this purpose. The charging device 6 can comprise a charging receptacle or charging socket 7 and a charger 8. The charger 8 may involve a type of device that can be installed in different vehicle models. Nevertheless, the charger 8 is designed for the purpose of efficiently charging the energy storage device 3 in the motor vehicle 1 by utilizing the thermal operating limitations of the charging device 6, in particular of the charging socket 7, resulting in the motor vehicle 1.

The charging device 8 may have a processor means 9, a data memory 10, and a temperature sensor 11 for this purpose. The processor means 9 can be provided, for example, by a microcontroller.

The charging device 8, in addition, can comprise a power electronics system 12, by means of which a charging current passing via the charging cable 5 from the charging station 4 to the energy storage device 3 can be controlled in its current intensity. The power electronics system 12 can be designed in a way known in and of itself. The charging cable 5 can be fastened and/or connected in the charging socket 7 via a charging plug 13 of the charging cable 5, and thus can be electrically coupled to the power electronics system 12.

The processor means 9 can be designed for the purpose of reading out a resistance coding PRX in the charging plug 13. The processor means 9 can be designed for the purpose of receiving a temperature value T from the temperature sensor 11. The processor means 9 can be designed for the purpose of receiving a current intensity value I of the charging current from the power electronics system 12. The processor means 9 can be designed for the purpose of reading out at least one configuration value G, for example, referring to a geometric configuration, thus, for example, a country-specific structural form of the charging socket 7 and/or the installation location of the temperature sensor 11, from the data memory 10. The resistance coding PRX, the temperature value T, the current intensity value I and the configuration value G each represent a configuration value for a current operating configuration, in which the charging socket 7 is operated.

The processor means 9 can comprise a characteristic map 14. By means of the characteristic map 14, the processor means 9 can determine from the configuration values received a temperature reading, for example, a temperature value or a binary value (over-temperature—yes/no), which indicates, e.g., whether the charging socket 7 is operated within its thermal operating limitations, thus, an operating temperature within the charging socket 7 that is below a pre-determined threshold value. A temperature sensor need not be provided in the charging socket 7 itself for this. By means of the characteristic map 14, the processor means 9 can meaningfully interpret the temperature value T of the temperature sensor 7, in which the current operating configuration is considered. If it is signaled by the temperature reading of the characteristic map that an over-temperature is present, the processor means 9 can actuate the power electronics system 12 and thereby, for example, interrupt the charging current or trigger or initiate a so-called derating, that is, a throttling of the charging current, in the power electronics system.

In addition to the temperature T, the different country versions of the charging socket, the resistance PRX in the plug, the flowing current I, and/or the charging operation (single-phase or dual-phase) are thus evaluated. The temperature measurement of the charging socket can be better interpreted in this way.

The advantage results thereby that a higher functional reliability and availability is ensured during the charging. Due to the different charging sockets on the world market and the different installation situations of the temperature sensors, there results a scattering of the determined temperature value by the different thermal resistances resulting thereby. Based on the interpretation of the respective country coding and/or phase number that is determined for the electrical phases utilized during charging, the temperature value T can be determined more precisely. An analysis of the additionally considered configuration values is possible by means of the stored characteristic curve, i.e., the characteristic map.

Overall, the example shows how a derating function can be provided by the invention for protecting the charging socket against thermal overload.

The invention claimed is:

1. A method for recognizing an over-temperature in a region of a charging socket of a motor vehicle without a temperature sensor, comprising:
   detecting a temperature value by means of a temperature sensor at an installation location of the temperature sensor that is different from the region;
   determining at least one configuration value of a current operating configuration, in which the charging socket is operated;
   producing a temperature reading for the region by means of a characteristic map, which is designed for the purpose of including the temperature value and the at least one configuration value as input variables and of assigning the temperature reading to the input variables;
   triggering a protective measure for the charging socket as a function of the temperature reading;
   wherein at least one configuration value is determined for a geometric configuration, a country-specific structural form of the charging socket, and the installation location.

2. The method according to claim 1, wherein at least one configuration value for a switch configuration reading that distinguishes between a single-phase and a multi-phase charging operation, and a cross section of a charging cable electrically connected to the charging socket is determined.

3. The method according to claim 2, wherein the switch configuration is determined by a readout of a resistance coding of the charging cable.

4. The method according to claim 1, wherein at least one configuration value is determined for an electrical configuration, whereby the electrical configuration indicates, a power class of the charging socket; a current intensity of a charging current; electrical voltage of a connected charging station; a frequency of the voltage; an operating time from which charging has occurred; and a charging state of an energy storage device that is charged with the current operating configuration via the charging socket.

5. The method according to claim 1, wherein, as the protective measure, an electrical charging process of the motor vehicle is interrupted or a charging current intensity is throttled, in each case when the temperature reading signals the over-temperature.

6. The method according to claim 1, wherein, by means of the characteristic map, a defect of the charging socket is recognized, based on a combination of temperature value and at least one configuration value.

7. A charging device for a motor vehicle, comprising:
   a temperature sensor arranged in the charging device for producing a temperature value;
   a means for querying a configuration, which is designed for the purpose of determining at least one respective configuration value of a current operating configuration of the charging socket;
   a characteristic map, which is designed for the purpose of including the temperature value and the at least one configuration value as input variables and of assigning a temperature reading to the input variables;
   wherein at least one configuration value is determined for a geometric configuration, a country-specific structural form of the charging socket, and the installation location.

* * * * *